United States Patent [19]
Lin

[11] Patent Number: 5,210,790
[45] Date of Patent: May 11, 1993

[54] DEVICE FOR SETTING AND TONE DIALING A SINGLE TELEPHONE NUMBER

[75] Inventor: Jing-Yaun Lin, Hsinchu, Taiwan

[73] Assignee: Winbond Electronics Corp., Taiwan

[21] Appl. No.: 650,916

[22] Filed: Feb. 5, 1991

[51] Int. Cl.$^5$ ............................................. H04M 1/26
[52] U.S. Cl. ................................... 379/368; 379/355; 379/441
[58] Field of Search ............... 379/355, 357, 361, 368, 379/441

[56] References Cited

U.S. PATENT DOCUMENTS

| | | | |
|---|---|---|---|
| 2,945,312 | 9/1958 | Book | 379/441 X |
| 3,864,857 | 2/1975 | Brude | 379/441 X |
| 3,943,289 | 3/1976 | Sheldon et al. | 379/355 X |
| 3,982,079 | 9/1976 | Hoehn et al. | 379/357 X |
| 4,126,768 | 11/1978 | Grenzow | 379/357 |
| 4,219,699 | 8/1980 | Nilssen et al. | 379/361 X |
| 4,535,204 | 8/1985 | Hughes et al. | 379/355 |
| 4,707,854 | 11/1987 | Mayer | 379/355 X |
| 4,763,355 | 8/1988 | Cox | 379/361 X |
| 4,817,135 | 3/1989 | Winebaum | 379/355 |

*Primary Examiner*—Thomas W. Brown
*Assistant Examiner*—M. Shehata
*Attorney, Agent, or Firm*—Harness, Dickey & Pierce

[57] ABSTRACT

A device for setting and tone dialing a single telephone number includes a telephone number setting device to generate a digital signal corresponding to the binary equivalent of the digits of the telephone number to be set. A tone generator receives the digital signal generated and groups the digital signal into a predetermined number of bit groups. Each of the bit groups corresponds to one of the digits of the telephone number. The bit groups are accessed one at a time and a dual tone multi-frequency signal corresponding to the digit represented by the accessed bit group is generated by the tone generator and is directed to the telephone instrument.

10 Claims, 5 Drawing Sheets

DEVICE FOR SETTING AND TONE DIALING A SINGLE TELEPHONE NUMBER

BACKGROUND OF THE INVENTION

1. Field Of The Invention

The invention relates to a telephone tone dialing device, more particularly to a device, to be connected to a telephone, for setting and tone dialing a single telephone number.

2. Description Of The Related Art

Devices for setting and tone dialing a plurality of telephone numbers are known in the art. Such devices are usually built into most modern telephones. These devices permit a plurality of telephone numbers to be stored in a memory unit of the telephone so that a minimum number of keys is pressed to automatically dial the desired telephone number.

Pocket dialers are also available and can achieve the same functions as those of the built-in devices. The main advantage of the pocket dialers over the built-in devices is that they are portable and can be easily connected to different telephones. Thus, the desired telephone number can still be automatically dialed by simply pressing one or two keys even if the telephone number is not present in the memory unit of the telephone to be used (or, if that telephone has no memory unit), as long as said telephone number is stored in the memory unit of the pocket dialer.

SUMMARY OF THE INVENTION

The objective of the present invention is to provide a device, to be connected to a telephone, for setting and tone dialing a single telephone number.

Accordingly, the preferred embodiment of a device for setting and tone dialing a single telephone number, of the present invention comprises a telephone number setting device to generate a digital signal corresponding to the binary equivalent of the digits of the telephone number to be set; and a tone generator to receive the digital signal generated and group the digital signal into a predetermined number of bit groups. Each of the bit groups corresponds to one of the digits of the telephone number. The bit groups are accessed one at a time and a dual tone multi-frequency signal corresponding to the digit represented by the accessed bit group is generated by the tone generator and is received by the telephone. A personal computer can replace the telephone number setting device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
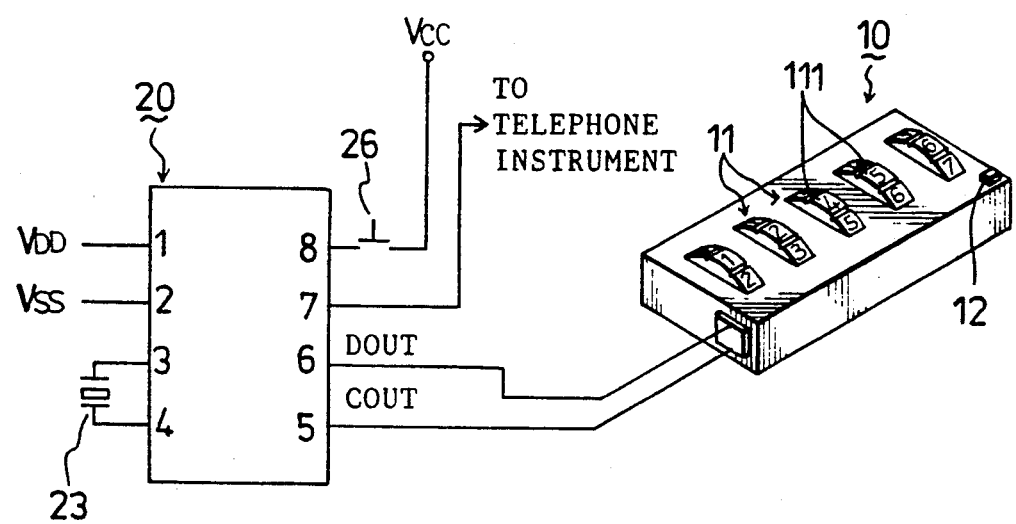
FIG. 1 is an illustration of the preferred embodiment of a device for setting and tone dialing a single telephone number according to the present invention.

Referring to FIG. 1, the preferred embodiment of a device for setting and tone dialing a single telephone number according to the present invention is shown to comprise a telephone number setting device 10 and a tone generator 20.

The telephone number setting device 10 comprises a plurality of combination dial wheels 11 arranged side by side to one another, like those of briefcase lock devices. Each dial wheel 11 is divided into twelve sections 111 and corresponds to one of the digits (selected from the numbers 0 to 9, and the symbols * and #) of the telephone number to be set. The dial wheels 11 are rotated such that the digits of the telephone number to be set are arranged in the proper sequence and are properly aligned. Each dial wheel 11 has a four bit binary output D0 to D3 corresponding to the binary equivalent of the selected digit.

Figure 2A:
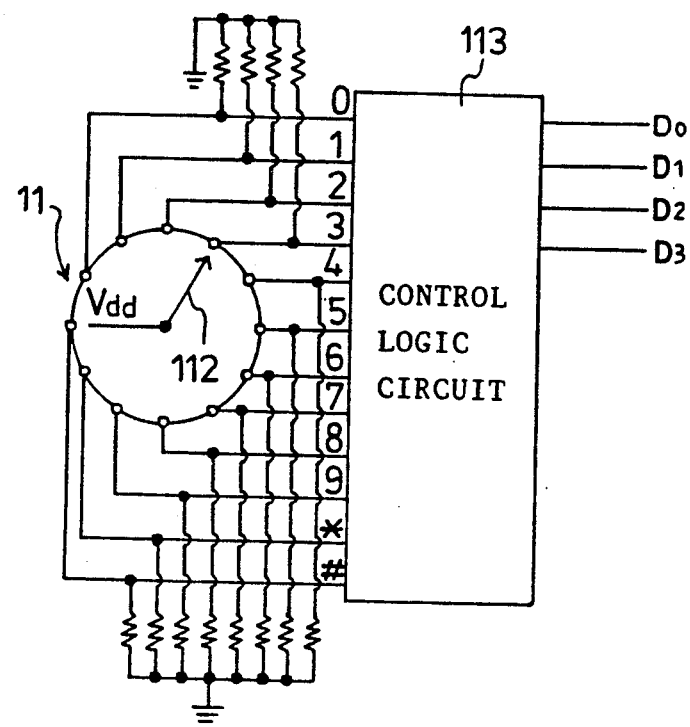
FIG. 2A illustrates a first method of generating a binary signal corresponding to one of the digits of the telephone number to be set.

There are many methods that can be used to generate the binary output D0 to D3. One such method is represented by FIG. 2A. The center of each dial wheel 11 is connected to a voltage source Vdd. Each of the sections 111 of the dial wheel 11 is connected to one of the terminals of a grounded resistor. Whenever the dial wheel 11 is rotated, one of the sections 111 comes into contact with a fixed switch pole 112 connecting the one section 111 to the voltage source Vdd, thereby changing the logic state of the one section 111 from a low logic state to a high logic state. The sections 111 are connected to a control logic circuit 113 which detects the change in logic state and generates the desired binary output D0 to D3.

Figure 2B:
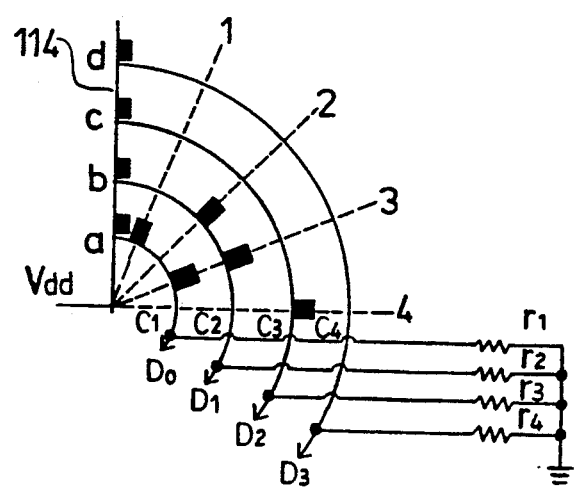
FIG. 2B illustrates a second method of generating a binary signal corresponding to one of the digits of the telephone number to be set.

A second method of generating the binary output D0 to D3 is represented by FIG. 2B. The center of each dial wheel 11 is similarly connected to a voltage source Vdd. A rotary pole 114 is electrically connected to the voltage source Vdd and is provided with four contact terminals a to d. A printed circuit board (PCB) is disposed adjacent to each dial wheel 11 and is provided with four predesigned concentric conduction patterns c1 to c4. The concentric patterns c1 to c4 are connected to one terminal of a resistor r1 to r4, respectively. The other terminal of the resistors r1 to r4 is grounded. Whenever the dial wheel 11 is rotated, the contact terminals a to d make or break electrical contact with the concentric patterns c1 to c4. The desired binary output D0 to D3 can be determined by the logic states of the resistors r1 to r4.

Figure 3:
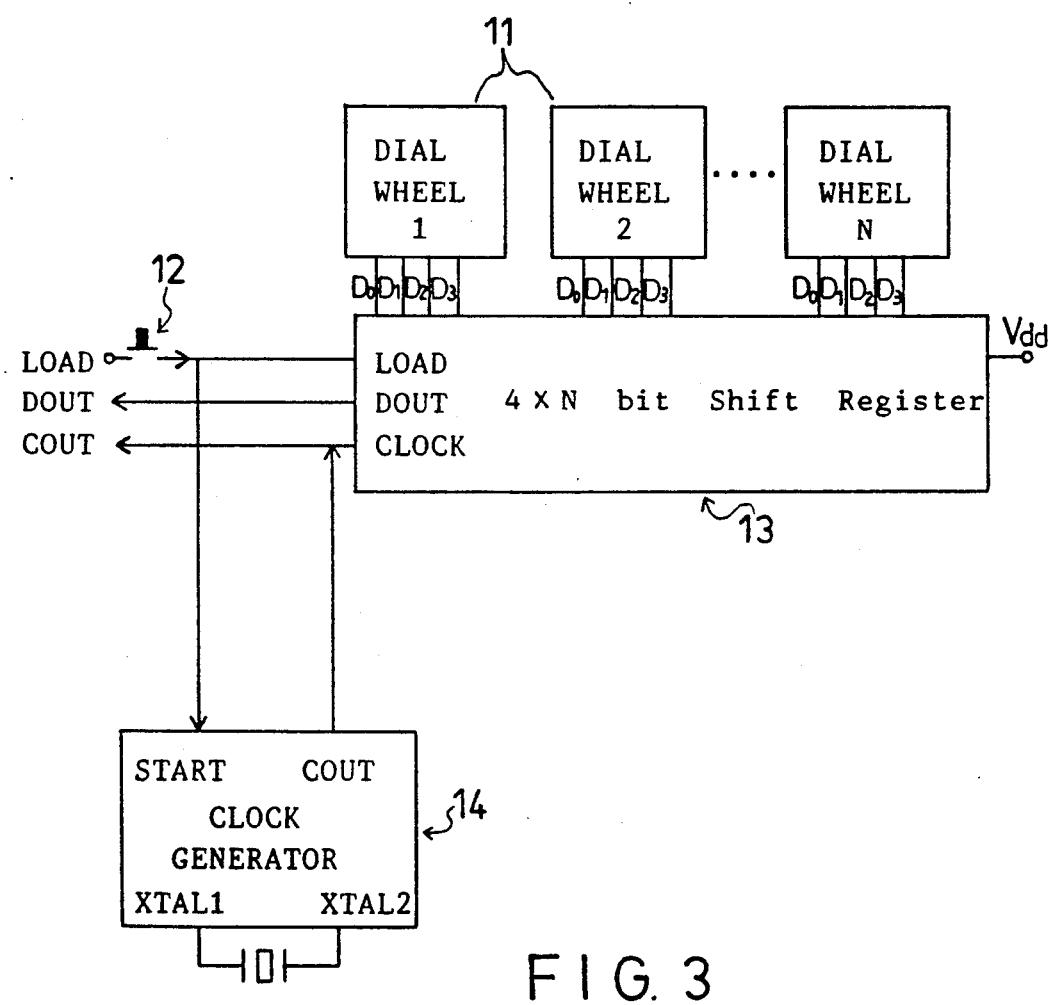
FIG. 3 is a schematic circuit diagram of a telephone number setting device of the preferred embodiment.

Referring to FIGS. 1 and 3, when the dial wheels 11 have been properly arranged to correspond to the telephone number to be set, a load switch 12 is then operated. The binary outputs of the dial wheels 11 are then received by a 4×N bit shift register 13 (N being the number of dial wheels 11 present). Upon operation of the load switch 12, a clock generator 14 is triggered to generate 4×N clock pulses. The clock pulses serve as a clock input to the shift register 13, which responds by serially outputting its contents. The serial output Dout of the shift register 13, and the clock pulse output Cout of the clock generator 14 serve as inputs to the tone generator 20.

Figure 4:
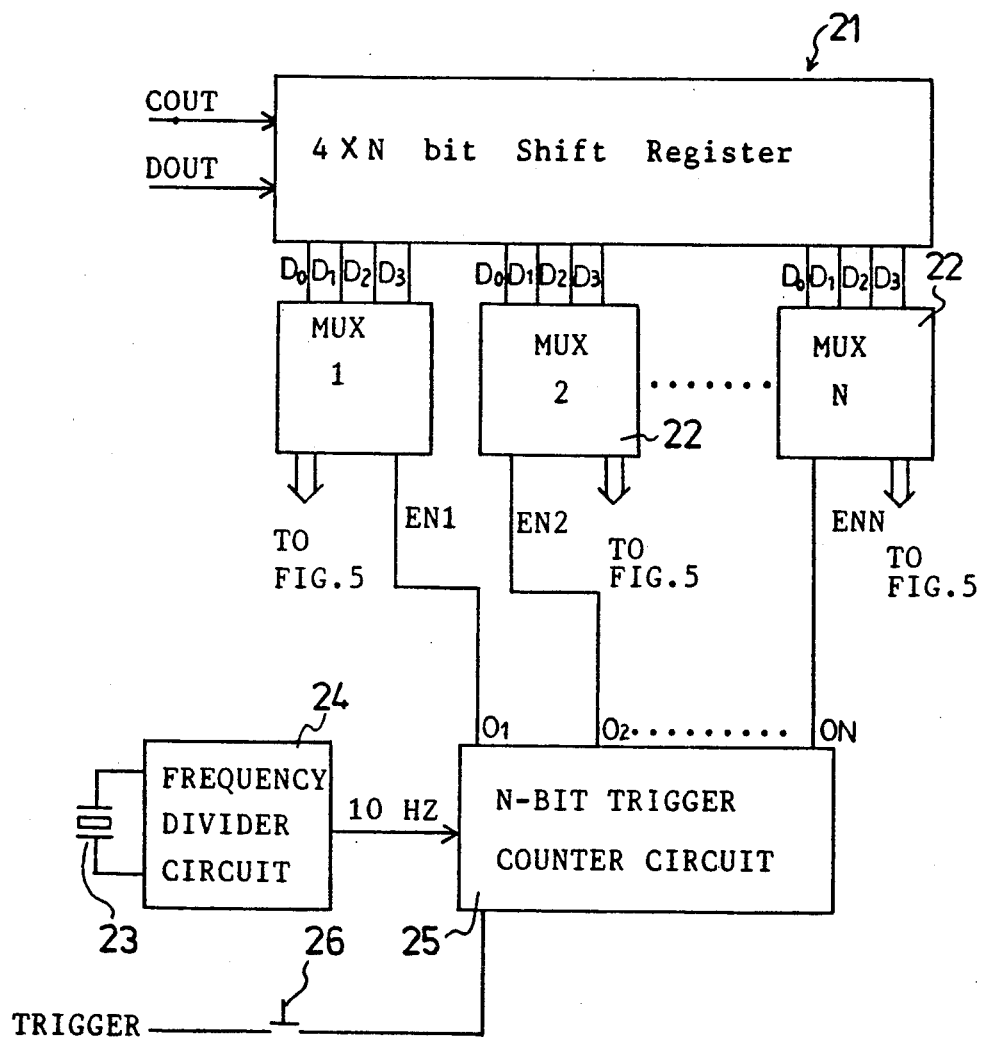
FIGS. 4 and 5 are schematic circuit diagrams of a tone generator of the preferred embodiment.

Referring to FIGS. 1 and 4, the tone generator 20 is disposed in a single integrated circuit (IC) chip and is to be connected to a telephone. The tone generator 20 has a 4×N bit shift register 21 which is triggered by the clock pulse output Cout to serially receive the output Dout of the shift register 13. The data bits loaded into the shift register 21 are grouped into sets of four, each group corresponding to one of the digits of the telephone number to be set. Each group serves as an input to one of N multiplexers 22. After Dout has been loaded into the shift register 21, the telephone number setting device 10 can be disconnected from the tone generator 20. The telephone number setting device 10 is once more connected to the tone generator 20 when it is desired to replace the set telephone number.

The tone generator 20 is connected to a crystal oscillator 23. The output of the crystal oscillator 23 serves as an input to a frequency divider circuit 24 so as to generate a 10 Hz access signal. The access signal serves as an input to an N-bit trigger counter circuit 25. Each of the output pins of the trigger counter circuit 25 is connected to the Enable pin (EN) of a respective multiplexer 22. When a trigger switch 26 of the tone generator 20 is operated, the trigger counter circuit 25 has an output which enables each of the multiplexers 22 in succession. That is, only one of the multiplexers 22 is enabled for each complete cycle of the access signal. The trigger switch 26 may be an external switch or an unused push button key of the telephone.

Figure 5:
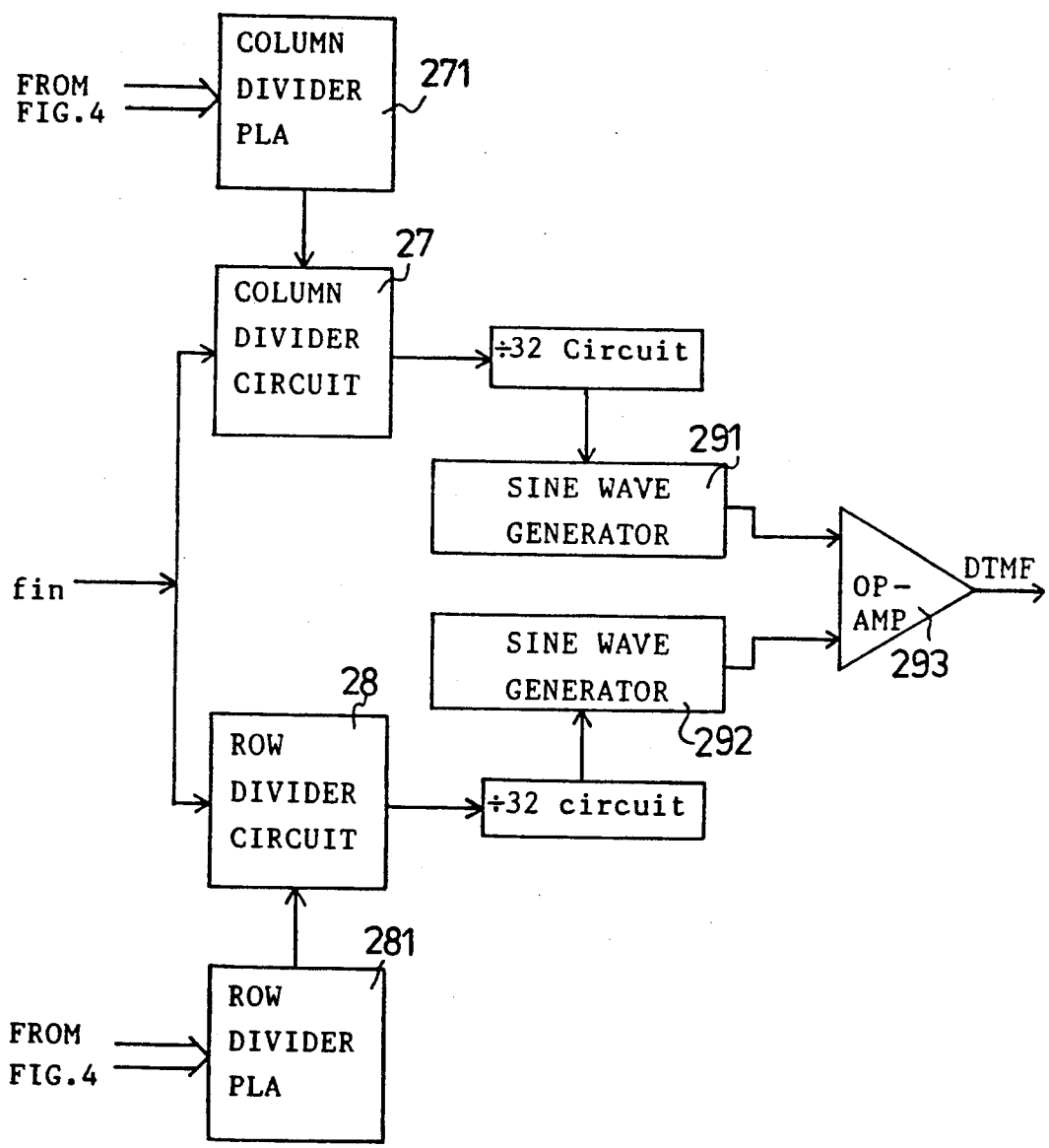

Referring to FIG. 5, the frequency output of the crystal oscillator 23 serves as the input to a column divider circuit 27 and to a row divider circuit 28 to produce the Dual Tone Multi-Frequency (DTMF) signal. The output of the enabled multiplexer 22 is received by a column divisor programmable logic array 271 and by a row divisor programmable logic array 281 so as to select the proper divisor for the column and row divider circuits 27 and 28. Thus, assuming that the frequency output of the crystal oscillator 23 is 894.886 kHz, and that the output of the enabled multiplexer 22 is 0001 (which corresponds to the decimal number 1), the frequency output of the crystal oscillator 23 should be divided by the column divider circuit 27 by a factor of 23 and should be divided by the row divider circuit 28 by a factor of 40. The outputs of the row and column divider circuits 27 and 28 are further divided by a factor of 32 and are converted into sinusoidal signals by sine wave generators 291 and 292. (The divisors for the other decimal numbers and symbols can be derived from the foregoing explanation and will not be detailed further).

The frequency output of sine wave generator 291 is 1216 Hz, while that for sine wave generator 292 is 699 Hz. The frequencies obtained are approximately equal to the standard DTMF frequencies of 1209 Hz and 697 Hz for the decimal number 1. (The list of standard DTMF frequencies can be readily obtained from various reference materials). The outputs of the sine wave generators 291 and 292 serve as inputs to an operational amplifier summer 293 having a DTMF output received by the telephone.

An important feature of the present invention is that a personal computer may be programmed to generate the serial output Dout and the clock pulse output Cout, thus replacing the telephone number setting device 10. The operation of the preferred embodiment when using a personal computer is substantially the same and will not be detailed herein.

It is shown that the present invention is easy to operate and is less expensive than prior such devices since no memory chips have been used. Thus, the present invention can serve as an inexpensive gift item which companies can give to their clients.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A device for setting a group of digits and for generating dual-tone multi-frequency signals corresponding to said group of digits, comprising:
    means for generating a digital signal corresponding to the binary equivalent of said group of digits;
    means for grouping said digital signal into a predetermined number of bit groups, each said bit group corresponding to one of the digits of said digit group;
    means for accessing said bit groups one at a time; and
    means for generating a dual tone multi-frequency signal corresponding to the digit represented by the accessed said bit group.

2. The device as claimed in claim 1, wherein said group of digits is a telephone number.

3. The device as claimed in claim 1, wherein said digital signal generating means comprises:
    a set of combination dial wheels arranged side by side, each said dial wheel being divided into a predetermined number of wheel sections and corresponding to one of the digits of said set group, each said dial wheel having an output corresponding to the binary equivalent of the chosen one said wheel section;
    a shift register means to receive said output of each said dial wheel;
    a load switch means operated to enable said shift register means to receive said output of each said dial wheel; and
    a clock generating means triggered by said load switch means to generate a predetermined number of clock pulses received by said shift register means, said output of each said dial wheel being serially outputted by said shift register means upon reception of said clock pulses.

4. The device as claimed in claim 1, wherein said grouping means comprises:
    a shift register means to serially receive said digital signal, said shift register means having a plurality of output bits corresponding to the received said digital signal; and
    a plurality of multiplexer means to group said output bits into said bit groups.

5. The device as claimed in claim 4, wherein said digital signal generating means has a clock pulse output received by said shift register means to actuate said shift register means to serially receive said digital signal.

6. The device as claimed in claim 4, wherein said accessing means comprises:
    means for generating an access signal;
    a trigger counter means receiving said access signal and having output pins connected to said multiplexer means; and
    a trigger switching means operated to actuate said trigger counter means so as to generate an output signal to enable each said multiplexer means in succession.

7. The device as claimed in claim 6, wherein said dual tone multi-frequency signal is received by a telephone instrument.

8. The device as claimed in claim 7, wherein said trigger switching means is a push button key of the telephone instrument.

9. The device as claimed in claim 1, wherein said digital signal generating means is a personal computer.

10. The device as claimed in claim 1, wherein said grouping means, said accessing means, and said dual tone multi-frequency signal generating means are integrated in a single IC chip.

* * * * *

UNITED STATES PATENT AND TRADEMARK OFFICE
CERTIFICATE OF CORRECTION

PATENT NO. : 5,210,790

DATED : May 11, 1993

INVENTOR(S) : Jing-Yuan Lin

It is certified that error appears in the above-identified patent and that said Letters Patent is hereby corrected as shown below:

On the Title Page, under "Inventor", "Jing-Yaun" should be --Jing-Yuan--.

Signed and Sealed this

Eleventh Day of January, 1994

Attest:

BRUCE LEHMAN

Attesting Officer

Commissioner of Patents and Trademarks